July 31, 1962  E. F. LINHORST  3,046,600
MOLDING METHOD AND APPARATUS
Filed May 15, 1961  2 Sheets-Sheet 1

INVENTOR
Erwin F. Linhorst
BY
Jack Rosin
ATTORNEY

July 31, 1962 E. F. LINHORST 3,046,600
MOLDING METHOD AND APPARATUS
Filed May 15, 1961 2 Sheets-Sheet 2

INVENTOR
Erwin F. Linhorst
BY Jack Rosin
ATTORNEY

3,046,600
MOLDING METHOD AND APPARATUS
Erwin F. Linhorst, Paterson, N.J., assignor to United States Rubber Company, New York, N.Y., a corporation of New Jersey
Filed May 15, 1961, Ser. No. 109,965
14 Claims. (Cl. 18—5)

This invention relates generally to a method of and apparatus for molding rubber and rubber-like articles.

Molding operations, as presently carried out by known molding methods and apparatus, are generally beset by a number of difficulties which result in relatively large wastes of material and effort. These difficulties occur to a greater or lesser degree in such common molding operations as compression molding, transfer molding, injection molding, and molding operations having aspects of more than one of the foregoing, such as, for example, "the bottomless cylinder" type of molding.

Molding scrap losses in both the bottomless cylinder type of molding and the compression type of molding are of particular concern to the molder in that they represent an appreciable percentage of the cost of the finished article. In the former case, an injection piston or plunger engages a mass of molding compound which is located in a substantially bottomless cylindrical cavity so as to force the compound against the sprue plate of a mold, through the sprue openings, and into the cavities of the mold. Although a large amount of this molding compound actually enters the cavities to form the molded article, there always remains a sheet or pad of the compound between the piston and the sprue plate at the end of the injection stroke. Inasmuch as the cylinder and injection piston in conventional bottomless cylinder molding operations cannot be retracted from the mold without permitting the molding compound to flow out of the mold cavities, because it may result in "dimpling" at the sprue openings and objectionable flash at the mold plate parting lines, the aforesaid pad of molding compound is usually cured with the injected portion of the compound and represents a complete waste.

Similarly, in compression molding, there is also present an inherently high ratio of waste scrap to utilized compound. In this case, the cavities of an open mold are each generally individually pre-loaded with "biscuits" of compound, each biscuit being in excess of the amount required to fill its associated cavity to insure that the cavities will be completely filled when the mold is closed and put under compression. As a result, a large amount of excess molding compound flows out of the cavities as waste flash when the mold is closed and compressed, and this stock is cured along with the molding compound in the cavities. The compression molding operation results not only in large scrap losses but in time and labor losses necessitated by the pre-loading of the cavities and the trimming of cured flash from the finished article.

Accordingly, therefore, an important object of the present invention is to provide a new and improved molding method and apparatus which is free of the drawbacks and disadvantages of many presently used methods and apparatus.

Another object of the present invention is the provision of a new and improved method and apparatus for substantially decreasing molding scrap losses in the molding of rubber and rubber-like articles.

A further object of the present invention is the provision of a new and improved method of and apparatus for molding rubber and rubber-like articles in which excess molding compound which would normally be cured along with the compound in the cavities of a mold is removed prior to curing.

A related object of this invention is the provision of a new and improved method of and apparatus for molding rubber and rubber-like articles wherein the flash produced during the molding operation is held to a minimum, to thereby keep the production costs relatively low.

Another object of this invention is the provision of a new and improved method of and apparatus for molding rubber and rubber-like articles that can be relatively easily mechanized or automated.

Further objects and advantages of this invention will become apparent as the following description proceeds.

Briefly stated, and in accordance with one embodiment of this invention, the method of this invention is practiced by placing a cavity containing mold in a channel having at least a portion thereof confined, adding a predetermined amount of molding compound adjacent a surface of the mold within the confined portion of the channel, compressing the compound against the mold within the confined portion of the channel so that the compound flows into the cavities of the mold and the excess compound forms a layer adjacent to the mold, thereafter providing communication between the excess compound layer and the space surrounding the channel to allow the excess compound to be squeezed out of the channel, and then curing the compound in the mold cavities.

An apparatus in accordance with one embodiment of this invention comprises a frame, a structure forming a channel carried by the frame and adapted to receive at an inlet thereof a plurality of mold members which form a column within the channel, means for adding uncured molding compound between at least two adjacent mold members within the channel, means to compress the column of molds, and means to confine within at least a portion of said channel the two adjacent mold members and the compound therebetween during compression of the column while at least a portion of the remainder of the channel remains unconfined so that the compound flows into the cavity of at least one of the two adjacent mold members while the excess uncured compound in the portion of the remainder of the channel flows out of the channel to be recovered.

While the specification concludes with claims particularly pointing out and distinctly claiming the subject matter regarded as this invention, it is believed that the invention will be better understood from the following description taken in connection with the accompanying drawings in which:

FIG. 4 is a sectional end elevation taken along the line 4—4 of FIG. 1.

Figure 1:
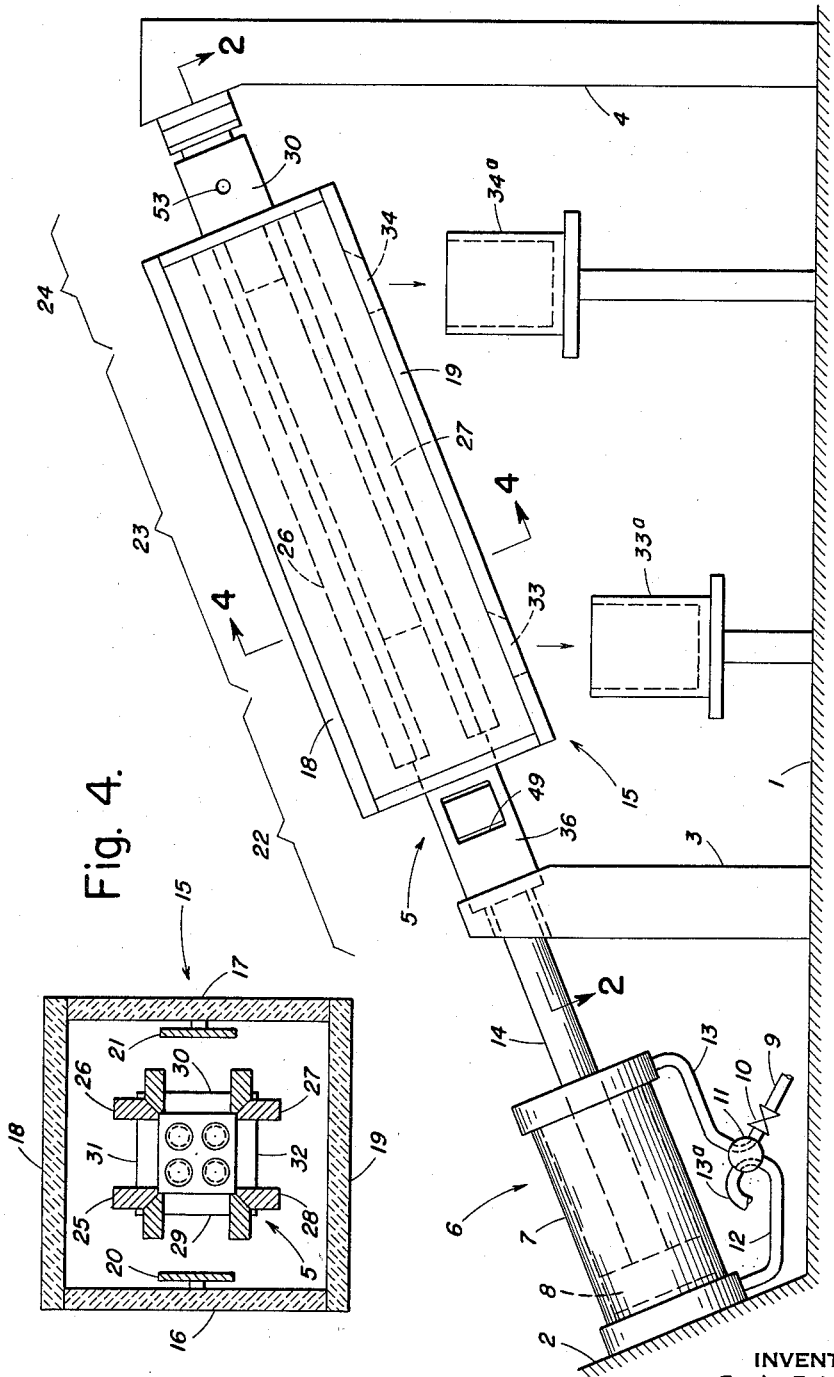
FIG. 1 is a side elevational view of a channel type molding apparatus embodying features of this invention.

Referring to the drawings, there has been illustrated a preferred apparatus for putting this invention into operation. Although the selected apparatus has been illustrated as being positioned at an inclined angle to the horizontal, it may equally well be horizontally or vertically disposed by making slight modifications to the illustrated embodiment. For purposes of description, the apparatus will be considered as one employed in the manufacture of bottle stoppers, however, numerous other articles may be made by employing molds with suitably designed cavities.

The molding apparatus comprises a base or frame 1 having an inclined supporting surface 2 and first and second spaced vertical support legs 3 and 4, respectively. A channel forming structure, shown generally at 5, is suitably supported between the spaced vertical support legs 3 and 4, and a reciprocal means, shown generally at 6 and carried by the inclined supporting surface 2, cooperates with one end of the channel forming structure 5 during operation of the molding apparatus.

Reciprocal means 6 comprises a power cylinder 7 having a piston 8 movable therein. A pressurized fluid pumped from a source (not shown) is led to either end of the cylinder 7 through a conduit 9, stop valve 10, four-way reversing valve 11, and either one or the other of conduits 12 and 13. A return line 13a connects the inactive side of the cylinder 7 back to the fluid source. Reciprocal means 6 also includes a piston rod 14 having one end rigidly connected to the piston 8 and its other end movably mounted within the channel forming structure 5.

A heated enclosure, shown generally at 15, is provided about a portion of the longitudinally extending channel structure 5. The heated enclosure 15 comprises first and second sidewalls 16 and 17, respectively (FIG. 4), a top wall 18, and a bottom wall 19. Conventional electrical heating elements 20 and 21 are supported by the sidewalls 16 and 17, respectively, and extend therealong for curing the molding compound as it progresses through the channel forming structure 5, within the heated enclosure 15.

The longitudinally extending channel forming structure 5 may be conveniently broken down into three sections for purposes of description. The structure comprises a confined inlet portion 22, an unconfined curing portion 23, and a confined outlet portion 24. The inlet portion 22 of the channel forming structure is connected with the outlet portion 24 thereof by means of a plurality of longitudinally extending angle members 25, 26, 27 and 28 (see FIG. 4). The angle members 25 through 28 are interconnected and held in spaced relationship at the outlet portion 24 by means of a pair of sidewall members 29 and 30, a top wall member 31 and a bottom wall member 32.

The bottom wall 19 (FIG. 1) of the heated enclosure 15 is provided with spaced openings 33 and 34 therethrough. A first receptacle 33a, positioned beneath the opening 33, serves to accumulate uncured molding compound that is discharged from the channel forming structure 5 prior to curing. Similarly, a second receptacle 34a, positioned under the second opening 34, serves to accumulate cured molding compound discharged from the channel forming structure 5 during operation of the molding apparatus.

Figure 2:
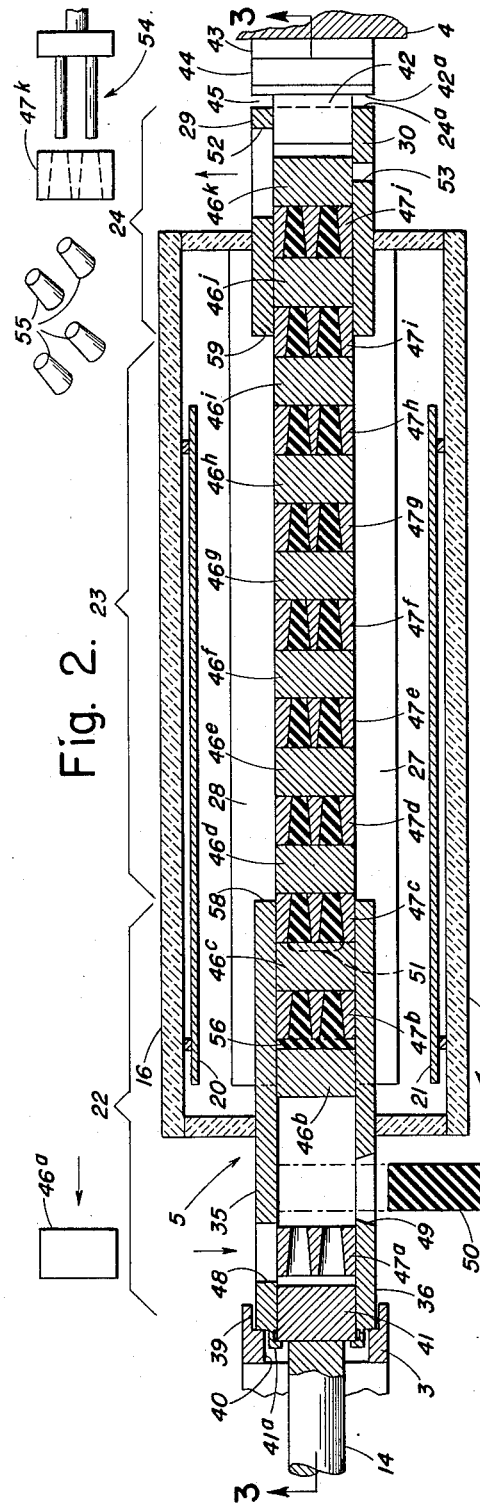
FIG. 2 is a sectional plan view taken along the line 2—2 of FIG. 1.
Figure 3:
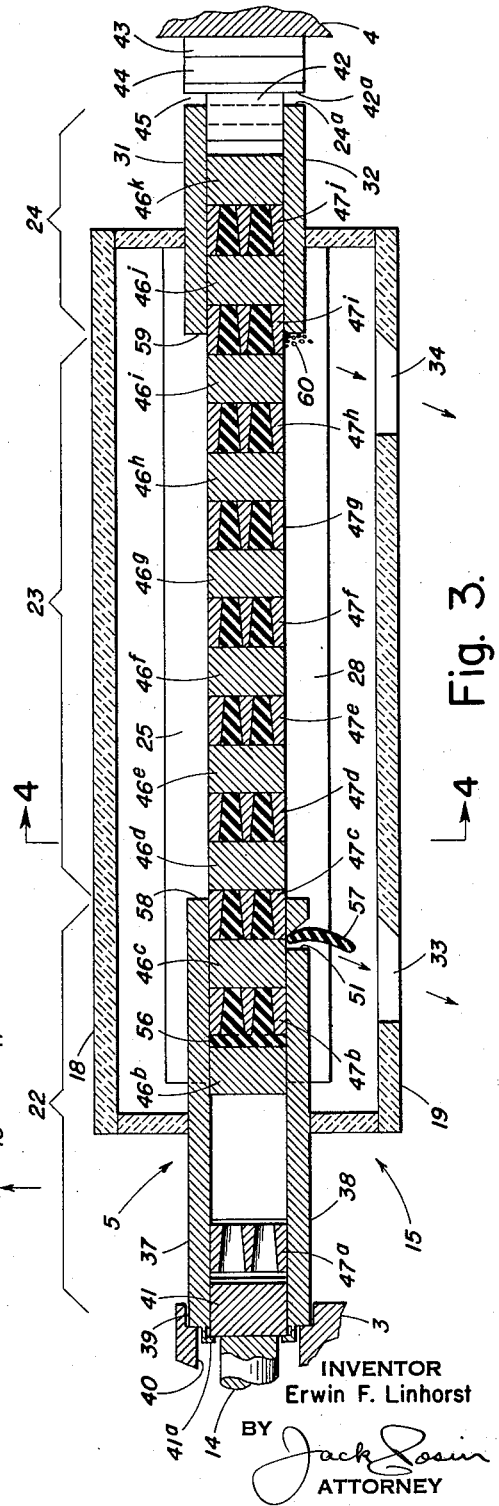
FIG. 3 is a sectional elevational view taken along the line 3—3 of FIG. 2.

Reference may now be had to FIGS. 2 and 3 wherein the details of the inlet and outlet portions of the channel forming structure have been more clearly illustrated. The confined inlet portion 22 of the structure includes first and second spaced sidewalls 35 and 36, respectively, a top wall 37, and a bottom wall 38, all of which are rigidly interconnected to each other and to the longitudinally extending angle members 25 through 28 to form the longitudinally extending generally square channel or passageway through which the bottle stopper mold plates may be passed.

The inlet portion 22 of the channel forming structure 5 is slidably supported for limited longitudinal movement by the vertical support leg 3 in a recess 39 formed for that purpose. The piston rod 14 extends through an aperture 40 in the support leg 3 and carries a plunger 41 at the end thereof. The plunger 41 slidably and frictionally engages the inlet end of the channel forming structure 5 during its forward and return strokes and abuts hooks 41a near the end of its return stroke for purposes which will become more apparent hereinafter.

The outlet portion 24 of the channel forming structure 5 is also slidably supported for limited longitudinal movement on a steel block 42 which enters the interior of the channel forming structure 5. Block 42 is in turn supported by the vertical support leg 4, with a steel plate 43 and an insulating plate 44 being provided to separate the steel block 42 from the support leg 4 to which it is bolted. The spacing between the vertical support legs 3 and 4 is such that a gap 45 is provided between the end face 24a of the outlet portion 24 and a shoulder 42a formed in the steel block 42. The gap 45 allows for a limited amount of longitudinal movement of the entire channel forming structure 5 between the vertical support legs 3 and 4 to facilitate removal of the mold plates from the channel.

As previously indicated, the channel type molding of this invention has been illustrated in an embodiment suitable for making bottle stoppers. In this connection a plurality of two-plate molds are employed, the exact number required being dependent on the size of the article being made, the thickness of the mold plates, and the length of the channel. In the example shown, eleven molds, comprising a total of twenty-two mold members or plates, are employed in the molding operation. Each mold includes an imperforate mold member or plate 46a through 46k, and a perforate four cavity mold member or plate 47a through 47k.

Inlet portion 22 of the channel forming structure is provided with an aperture 48 through the sidewall 35 thereof through which the various mold plates 46a–k and 47a–k may be introduced into the confined portion of the channel. Similarly, the opposite sidewall 36 of the inlet portion 22 is also provided with an aperture 49, upstream of the aperture 48, through which molding compound 50 may be introduced into the confined inlet portion of the channel between various of the mold plates therein. The inlet portion 22 of the channel forming structure 5 is also provided with a third aperture 51 (FIG. 3), in the bottom wall 38 thereof, through which excess uncured molding compound to be removed from the channel may pass in a manner to be described.

Provision is made in the confined outlet portion 24 of the channel forming structure 5 for removing the various mold members or plates from the channel after they have progressed therethrough. As may be seen in FIG. 2, the sidewall member 29 includes an aperture 52 which is of sufficient size for the various mold plates to pass through the wall. Similarly, sidewall member 30 includes an opening 53, in alignment with aperture 52, through which an operator may project a rod (not shown) to force the various mold members or plates out of the channel. A parts ejection fixture, shown generally at 54, may be provided adjacent the outlet portion 24 of the molding apparatus to remove the cured articles, in this case the bottle stoppers 55, from the cavity mold plates 47a through 47k.

The curing portion 23 of the channel forming structure 5 is generally unconfined. In this portion of the structure the various molds are supported and guided in the channel due to the engagement of rabbets or slots formed in the angle members 25 through 28 (FIG. 4) with the corners of each mold member or plate. Thus, the heat generated by the heating elements 20 and 21 within the enclosure 15 may act directly on the molds to facilitate curing of the compound therein as the molds progress through the curing portion 23 of the channel.

Assuming that the channel forming structure 5 has been previously loaded with the various mold plates 47a through 47j and 46b through 46k, and that the apparatus is in the condition shown in FIGS. 2 and 3, the operator first inserts a push rod through opening 53 to force imperforate mold plate 46k out of the channel, and then he actuates the reversing valve 11 of reciprocal means 6 (FIG. 1) to cause plunger 41 to commence a compression stroke and start extending forwardly into the channel.

During the initial portion of the compression stroke or forward movement of the plunger 41, cavity mold plate 47a is pushed to the right, and friction between the plunger 41, mold plate 47a and the inner peripheral surface of the channel forming structure 5 causes the entire structure 5 to shift to the right until the upstream end face 24a of the outlet portion 24 abuts the shoulder 42a on steel block 42, thereby closing the gap 45. As the forward movement of plunger 41 continues, cavity plate 47a comes into abutment with imperforate mold plate 46b and then the entire mold column moves to the right within channel forming structure 5 until the now last mold plate 47j in the column abuts the projecting end face of steel block 42. At this time the entire column is placed under compression due to the column being clamped between plunger 41 and block 42.

The operator then switches the reversing valve 11 (FIG. 1) to retract the piston 14 and plunger 41 back to the starting position. During this return or back stroke, friction between the plunger 41 and the inner peripheral surface of the channel forming structure 5 plus the engagement of the plunger 41 with the hooks 41a causes the entire structure 5 to shift to the left thereby re-opening gap 45 to allow removal of the new top mold plate 47j. When this has been done, imperforate mold plate 46a (FIG. 2) is inserted into the channel through aperture 48 and sufficient molding compound 50 is added to the channel through aperture 49 to fill the cavities of mold plate 47a and leave an excess layer of 10% to 20%.

The next cycle is then commenced with the reversing valve 11. As the imperforate plate 46a moves forward, it cuts off the molding compound from its supply source and pushes the compound toward the cavities of mold plate 47a, which is now occupying the position previously occupied by imperforate plate 46b. As before, the entire structure shifts to the right. Next, the added molding compound abuts cavity plate 47a and starts to fill the cavities therein, while the entire mold column starts shifting to the right within the structure 5 until the now top mold plate 46j abuts steel block 42. At this point, again, the column is placed under compression and the added molding compound 50, having no place else to go, flows into and fills the cavities of cavity plate 47a, while the excess compound forms a layer or pad between adjacent mold plates, as shown at 56.

After two or more cycles, the layer or pad 56 of excess compound meets the aperture 51 (FIG. 3) in the wall 38 and, during a compression stroke, is squeezed out of the confined inlet portion 22 of the channel as indicated at 57 in FIG. 3. The pad of excess compound 57, still in the uncured stage, then drops out of the enclosure 15 through the opening 33 and is collected in the receptacle 33a. Should a vertical embodiment of the apparatus be employed, an inclined guide channel may be provided to conduct the pad 57 through an opening in the wall of the heated enclosure 15 and into the receptacle 33a.

After the various mold plates pass the end 58 of confined inlet portion 22, they reach the unconfined curing portion 23 of channel forming structure 5 and are exposed except where the longitudinally extending angle members 25 through 28 touch them at the corners. As the molding compound warms up to the curing temperature, thermal expansion of the compound forces about 4% more flash out of the mold cavities. This additional flash cures along with the compound in the cavities and is sheared from the edges of the molds by the leading edge 59 of the confined outlet portion 24 of the channel forming structure 5. This 4% of flash represents essentially the only waste scrap produced. The shearing action produces small pieces of cured flash, indicated at 60, which drop down through the aperture 34 in the bottom wall 19 of heated enclosure 15 and are collected (FIG. 1) in the receptable 34a. The slight amount of flash produced at the interfaces between the cavity plates 47a through 47k and the mold plates 46a through 46k may be removed subsequently by tumbling the cured articles after they have been ejected from the cavity plates by means of the ejection fixture 54 (FIG. 2).

The walls 16 through 19 of the heated enclosure 15 may be of a suitable insulating material to prevent excessive heat losses from the heated enclosure 15. As in conventional molding operations, a suitable coating of silicone may be applied to all of the mold surfaces, including the cavities, to make it easier to separate the mold plates and eject the articles from the cavity plates. It will be apparent that the motion of the piston rod 14 could, through a system of push rod levers and the like, be used to conveniently automate the operation of the molding apparatus described herein. Alternatively, the automatic equipment shown in U.S. Patent No. 2,873,475, which is assigned to the assignee of the present invention, may be modified to adapt it to the present channel type molding apparatus.

It will be apparent to those skilled in the art that it is not essential in practicing this invention to use alternating imperforate mold plates and perforated cavity plates. For example, should it be desired to mold spherically shaped articles, each mold may include two mold plates each of which have hemispherical cavity or cutout portions which face each other within the channel. In this case the molding compound would be introduced between the opposed cutouts in the plates and compressed therebetween to force the molding compound into the opposed cavities. However, in this embodiment, clamps would be required at the outlet portion of the channel to separate the mold plates, and a revised ejection fixture would be necessitated.

Similarly, the channel itself could be formed in a circular, rather than a square, or rectangular, cross-section without departing from the scope of this invention. In this event, of course, correspondingly shaped mold plates would have to be provided in order for the mold plates to progress through the channel in the desired manner.

While particular embodiments of this invention have been shown and/or described, it will be obvious to those skilled in the art that various other changes and modifications may be made without departing from the invention in its broader aspects, and it is, therefore, aimed in the appended claims to cover all such changes and modifications as fall within the true spirit and scope of this invention.

Having thus described the invention, what is claimed as new and desired to be secured by Letters Patent of the United States is:

1. Molding apparatus, comprising: a frame; a structure forming a channel carried by said frame and adapted to receive at an inlet thereof a plurality of mold members which form a column within said channel; means for adding uncured molding compound between at least two adjacent mold members within said channel; means to compress said column of molds; and means to confine the compound between said two adjacent mold members and within said channel during compression of the column while at least a portion of the remaining mold members in said channel remains unconfined so that said compound flows into the cavities of at least one of said two adjacent mold members while the excess uncured compound in said portion of the remaining mold members flows out of said channel.

2. Molding apparatus as described in claim 1 wherein said compression means comprises a reciprocal member which advances the mold column within said channel toward an outlet thereof during its compression stroke; and further including means for heating said channel to cure said compound and means for removing the top mold member of the column from said channel following relaxation of the compression stroke.

3. Molding apparatus as described in claim 2 and including means positioned along said channel for removing cured compound from the peripheral surfaces of the mold members in said column.

4. Molding apparatus, comprising: a frame; a longitudinally extending structure forming a channel carried by said frame and adapted to receive at an inlet thereof a plurality of mold members which form a column movable therethrough; means for adding uncured molding compound between adjacent mold members at the inlet of said channel; means to confine said compound within the channel during the period it is adjacent the inlet of said channel, while the compound between mold members downstream of said inlet is unconfined; and means to compress said column to cause the compound adjacent the inlet to flow into the cavities of an adjacent mold member and the compound downstream of the inlet to flow out of the channel.

5. Molding apparatus, comprising: a frame; a longitudinally extending structure forming a channel having inlet and outlet openings carried by said frame and adapted to receive therein a column of mold members, certain ones of which are separated by molding compound, the components of said column being movable through said channel from said inlet to said outlet opening; means for confining molding compound between a first pair of mold members and within said channel adjacent the inlet opening thereof; means to compress said column so that the confined compound flows into the cavities of at least one mold member of said first pair of mold members, there being at least an unconfined second pair of mold members in said channel downstream from said first pair of mold members so that during compression of the column excess uncured compound flows out of said channel from between said second pair of mold members.

6. Molding apparatus as described in claim 5 and further including means to heat at least a portion of said column for curing the compound in the mold cavities; and means positioned along the channel and adjacent the outlet opening thereof for removing from the peripheral surfaces of said molds such cured compound as flows out of the mold cavities due to thermal expansion of the compound during curing thereof.

7. Molding apparatus, comprising: a frame; a longitudinally extending structure forming a channel mounted on said frame and adapted to movably carry therein a plurality of molding compound filled molds in the form of a column; means to heat said channel for curing the compound during movement of the molds therethrough; means to insert additional molds and uncured compound into said channel; means for moving the additional molds towards the mold column and compressing the compound therebetween so that said compound flows into the cavities of an adjacent mold; means for confining molding compound between molds in one portion of the channel and removing excessive compound from between molds in another portion of the channel while the moving means is actuated and maintains the column under compression; and means for removing molds from said channel while said moving means is de-actuated.

8. Molding apparatus, comprising: a frame; a longitudinally extending structure forming a channel carried by said frame and having an inlet portion, a curing portion, and an outlet portion extending therealong, said inlet and outlet portions each including a plurality of wall members forming enclosures about their respective portions of said channel, said inlet wall members having first, second, and third openings spaced therealong for, respectively, inserting molds comprising at least two mold members into said channel, inserting uncured molding compound between predetermined adjacent mold members in said channel, and allowing excess uncured compound to flow out of said channel, said second and third openings being spaced apart by a distance greater than the depth of each of the molds inserted into said channel, said outlet wall members having a fourth opening for removing molds from said channel; reciprocal means positioned adjacent to said inlet enclosure and movable therein for moving the molds inserted in said first opening towards said fourth opening and applying a compressive force to the entire column of molds in said channel so that the uncured compound enclosed by a pair of mold members located between the second and third openings in the inlet portion is squeezed into the cavities of one of said molds and the excess compound between a pair of mold members at the third opening of the inlet enclosure is squeezed out of the channel during compression of the column; and heating means adjacent the curing portion of said channel for curing the compound in the mold cavities during movement of the molds through said curing portion.

9. A method of molding including the steps of placing a cavity containing mold having at least one mold member in a confining channel, adding a predetermined amount of molding compound adjacent to a surface of said mold member within the confining channel, compressing the compound against the mold member within the confining channel so that the compound flows into and fills said mold cavities within said channel and excess compound forms a layer adjacent to said mold member, thereafter providing communication between the excess compound layer and the space surrounding the channel to allow the excess compound to be squeezed out of the channel, and then curing the compound in the mold cavities.

10. A method of molding including the steps of assembling a pair of mold members separated by a predetermined amount of molding compound in a confining channel to form a column, compressing said column while the compound is in the confining channel so that the compound flows into and fills the cavities of at least one of the mold members and excess compound remains between the mold members, thereafter providing communication between the excess compound and the space surrounding the channel to allow the excess compound to be squeezed out from between the mold members during compression of the column, and then curing the compound in the mold cavities.

11. A method of molding including the steps of assembling a pair of mold members separated by a predetermined amount of molding compound in a confining channel to form a column, compressing said column within the confining channel to squeeze part of the compound into the cavities of at least one of the mold members adjacent thereto while excess compound forms a layer between the mold members, moving the mold members along the channel to an unconfining portion thereof where the excess compound between the mold members communicates with the space surrounding the channel, compressing the column again to squeeze the excess compound out of the channel, and then curing the compound in the mold cavities.

12. A method of molding including the steps of forming a column of molds in a channel having a portion of its length confined from the space surrounding the channel, adding a predetermined amount of molding compound to the confined portion of the channel, compressing the compound within the confined portion of the channel and against the column to cause a portion of the compound to flow into and fill the cavities of a mold in the column while the excess compound forms a layer adjacent to said mold, moving the components of the column along the channel to an unconfined portion thereof so that the excess compound layer communicates with the space surrounding the channel, compressing the column to squeeze the excess compound layer out of the channel, and curing the compound in the mold cavities along the column.

13. A method of molding including the steps of adding molding compound and molds to one end of a column of molds in a channel and removing molds from the other end of said column, compressing the added molding compound against the column of molds in a confining portion of the channel to cause a portion of the added compound to flow into and fill the cavities of an adjacent mold while the remainder of the added compound is confined within the channel and forms a layer of excess compound adjacent to said mold, moving the column of molds within said channel so that the excess compound layer reaches an unconfining portion of the channel, again compressing said excess compound to squeeze the excess compound out of the channel, and heating the channel to cure the compound in the mold cavities as the molds progress through the channel from one end to the other end of said column.

14. A method of molding including the steps of (1) forming a column of multi-plate molds in a channel having at least an inlet portion thereof confined and at least another portion thereof unconfined and heated, at least one of the plates of each mold including one or more cavitites for receiving and shaping molding compound to a desired configuration; (2) removing at least the first mold plate in said column and adding at least one mold plate adjacent the last mold plate in said column; (3) moving said added mold plate into contact with said last mold plate; (4) moving the entire column of mold plates a distance equal to the depth of the removed mold plate; (5) again removing at least the first mold plate in said column and adding at least one mold plate adjacent the last mold plate in said column; (6) adding a predetermined amount of molding compound between said added mold plate and the last mold plate in said column; (7) moving said added mold plate toward said last mold plate to thereby form a layer of compound between said added mold plate and said last mold plate; (8) moving the entire column of mold plates and compound a distance equal to the depth of the mold plate removed in step 5; (9) compressing the entire column of mold plates and compound to thereby force a portion of the added compound into the cavities of at least one of its adjacent mold plates and form a layer of excess compound between said adjacent mold plates and within the confined portion of the channel; (10) repeating steps 2 through 9 so that the excess compound layer of step 9 moves into communication with the unconfined portion of said channel and is squeezed out of the channel during the compression of the column; (11) again repeating steps 2 through 9 a predetermined number of times to advance the mold plate of step 9 having compound filled cavities (a) through the heated portion of the enclosure to cure said compound, and (b) into the position of the first mold plate in said column; (12) removing said last named mold plate from said channel; and (13) thereafter ejecting and collecting the cured articles removed from the cavities of said mold plate.

References Cited in the file of this patent

UNITED STATES PATENTS

| | | |
|---|---|---|
| 131,626 | Noyes et al. | Sept. 24, 1872 |
| 1,548,537 | McDonald | Aug. 4, 1925 |
| 1,677,200 | Oakley | July 17, 1928 |
| 1,677,207 | Rett | July 17, 1928 |
| 2,169,281 | Pfanstiehl | Aug. 15, 1939 |
| 2,347,600 | Goode | Apr. 25, 1944 |
| 2,873,475 | Linhorst | Feb. 17, 1959 |
| 2,939,173 | Linhorst | June 7, 1960 |
| 2,943,353 | Fraula et al. | July 5, 1960 |